United States Patent [19]
Motose et al.

[11] Patent Number: 5,176,117
[45] Date of Patent: Jan. 5, 1993

[54] ENGINE CONTROL SYSTEM

[75] Inventors: Hitose Motose; Akihiko Hoshiba, both of Hamamatsu, Japan

[73] Assignee: Sanshin Kogyo Kabushiki Kaisha, Hamamatsu, Japan

[21] Appl. No.: 822,175

[22] Filed: Jan. 16, 1992

[30] Foreign Application Priority Data

Feb. 5, 1991 [JP] Japan .................................. 3-35205

[51] Int. Cl.⁵ .............................................. F02P 5/00
[52] U.S. Cl. .................................... 123/414; 123/416
[58] Field of Search ............... 123/406, 414, 417, 416, 123/418; 364/431.04

[56] References Cited

U.S. PATENT DOCUMENTS

| | | | |
|---|---|---|---|
| 4,747,382 | 5/1988 | Suzuki et al. | 123/418 |
| 4,787,355 | 11/1988 | Masda | 123/414 |
| 4,961,410 | 10/1990 | Matsumura et al. | 123/414 |
| 5,041,979 | 8/1991 | Hitka et al. | 364/431.04 |
| 5,054,447 | 10/1991 | Fukui et al. | 123/414 |
| 5,085,191 | 2/1992 | Okuda | 123/414 |
| 5,099,811 | 3/1992 | Frantz et al. | 123/416 |

Primary Examiner—Raymond A. Nelli
Attorney, Agent, or Firm—Ernest A. Beutler

[57] ABSTRACT

An improved method of determining engine ignition timing utilizing a simplified toothed wheel arrangement and sensors by determining angular shaft speed very close to the ignition timing.

6 Claims, 2 Drawing Sheets

ENGINE CONTROL SYSTEM

BACKGROUND OF THE INVENTION

This invention relates to an engine control system and more particularly to an improved arrangement for controlling the ignition timing of an internal combustion engine.

With ignition systems and particularly electronic ignition systems, one of two methods has conventionally been employed for initiating the timing of firing of the spark plug of an internal combustion engine. The spark timing is normally set to occur at a specific crankshaft angle with the actual angle of firing being dependent upon varying parameters of engine operation such as speed, load, etc. The timing angle has been measured as aforenoted by one of two methods.

The first method of determining the spark timing is to use a reference crank angle as a starting point for measuring the timing of the ignition. The time for the engine crankshaft to rotate from this reference angle position to the position at which the spark plug is fired is then computed based upon the average speed of rotation of the crankshaft and the ignition plug is fired at this time interval after the reference crank angle position passes. There is, however, a significant disadvantage to employing such a method. That is, the speed of rotation of the crankshaft actually varies during a given rotation due to a variety of factors. Therefore, the time interval for the crankshaft to move from the reference position to the desired timing position may not be accurately determined by using average crankshaft speed. This can result in poor ignition timing and, therefore, poor or incomplete combustion. In extreme cases, misfiring may actually occur.

Another method of determining the timing is to provide a toothed wheel and a sensor which provides an output signal when each tooth of the wheel passes it. The toothed wheel is either connected to the crankshaft or driven in timed relationship with it. Although such a system provides accurate angular measurement, the accuracy is dependent upon the number of the teeth on the wheel. Also, the timing must coincide with one of the wheel teeth and, this is why the accuracy will depend upon the number of teeth on the wheel. However, as the number of teeth on the wheel increases, the electrical circuitry associated with it becomes more complicated and the entire system becomes more expensive. Also, accuracy can fluctuate particularly as the number of teeth on the wheel is increased due to extraneous electrical noise.

It is, therefore, a principal object to this invention to provide an improved and simple arrangement for determining the ignition timing of an engine.

It is a further object to this invention to provide an arrangement which permits very accurate engine ignition timing with a relatively low cost system

SUMMARY OF THE INVENTION

This invention is adapted to be embodied in a method of controlling the timing of the firing of a spark plug of an internal combustion engine that has a shaft rotatably about an axis. The engine is provided with means for generating a reference signal indicative of a reference shaft angular position and for generating signals indicative of incremental shaft angular positions. The method comprises the steps of selecting a first angular shaft position in respect to the shaft reference angular position and a later second angularly shaft position both before the timing of the firing of the spark plug. A fixed amount of shaft angular rotation is determined and the time for the shaft to rotate through that selected fixed angular rotation is determined to compute an angular shaft rotational speed. The time for the shaft to reach the time of ignition timing from the second angular shaft position is then computed using the computed shaft angular velocity. The ignition plug is then fired at that time after the second angular position is reached.

DETAILED DESCRIPTION OF THE PREFERRED EMBODIMENT OF THE INVENTION

Figure 1:
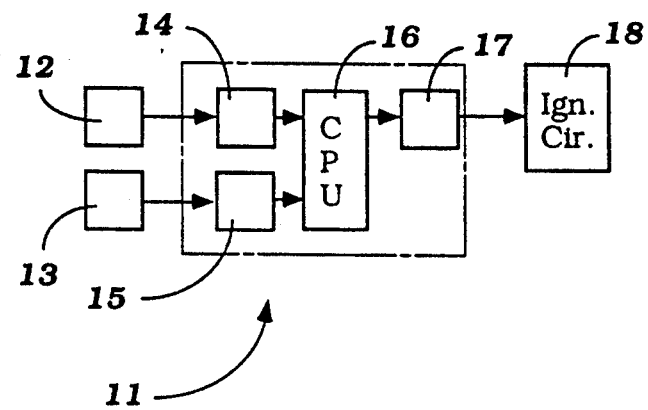
FIG. 1 is a schematic view showing the elements of the ignition timing control system constructed and operating in accordance with an embodiment of the invention.

Referring first in detail to FIG. 1, this illustrates in block form the components of an ignition timing control system, indicated generally by the reference numeral 11 and constructed and operated in accordance with the invention. The system 11 includes a pair of sensor devices 12 and 13 which are devices such as inductive coils that cooperate with a toothed wheel that is fixed for rotation with a crankshaft of an associated internal combustion engine. Such inductive devices and toothed wheels are well known in this art.

The outputs from the inductive devices 12 and 13 are transmitted to input circuits 14 and 15 of the ignition control circuit 11. These input circuits 14 and 15 output signals to a microcomputer 16 which receives signals from other engine operating parameters and compares them with pre-programmed, memorized maps that indicate the desired ignition timing for the observed engine operated conditions. Then the appropriate crank angle measurement is made, in a manner which will be described, and is transmitted to an output circuit 17. The output circuit 17 then transmit a controlling signal at the appropriate time to an ignition circuit, shown schematically at 18. The ignition circuit 18 may be of any known type such as an SCR controlled system wherein the triggering signal is transmitted to the gate of an SCR device for initiating firing of a spark plug. Such ignition circuits are well known and it is believed that those skilled in the art will readily be able to understand how the invention can be practiced with any of a wide variety of types of known ignition circuits.

Figure 2:
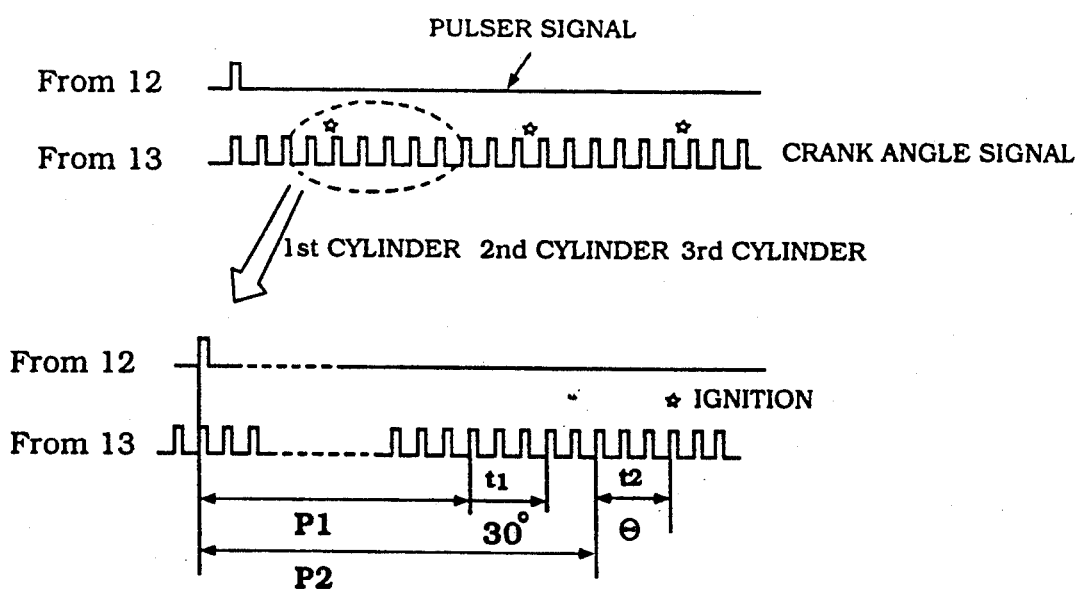
FIG. 2 is a graphical view showing the pulse signals from the system shown in FIG. 1 and explaining how the ignition timing is determined.

The output pulses from the devices 12 and 13 are shown in FIG. 2 and will be noted that the reference crankshaft angle position sensor 12 outputs only one signal or pulse each crankshaft revolution while the sensor 13 outputs a pulse for each increment of shaft angular rotation which will depend upon the number of teeth. In the illustrated embodiment, there are 360 teeth on the toothed wheel so that a pulse will be transmitted every 10 of crankshaft revolution. Of course, the system may employ a different number of teeth but the use of 360 teeth provides a relatively low cost and easily manufactured system. It should be noted that the outputs of the devices 12 and 13 are not square waves as shown in FIG. 2 but the input circuits 14 and 15 convert these output pulses into square wave signals for transmission to the CPU 16.

Figure 3:
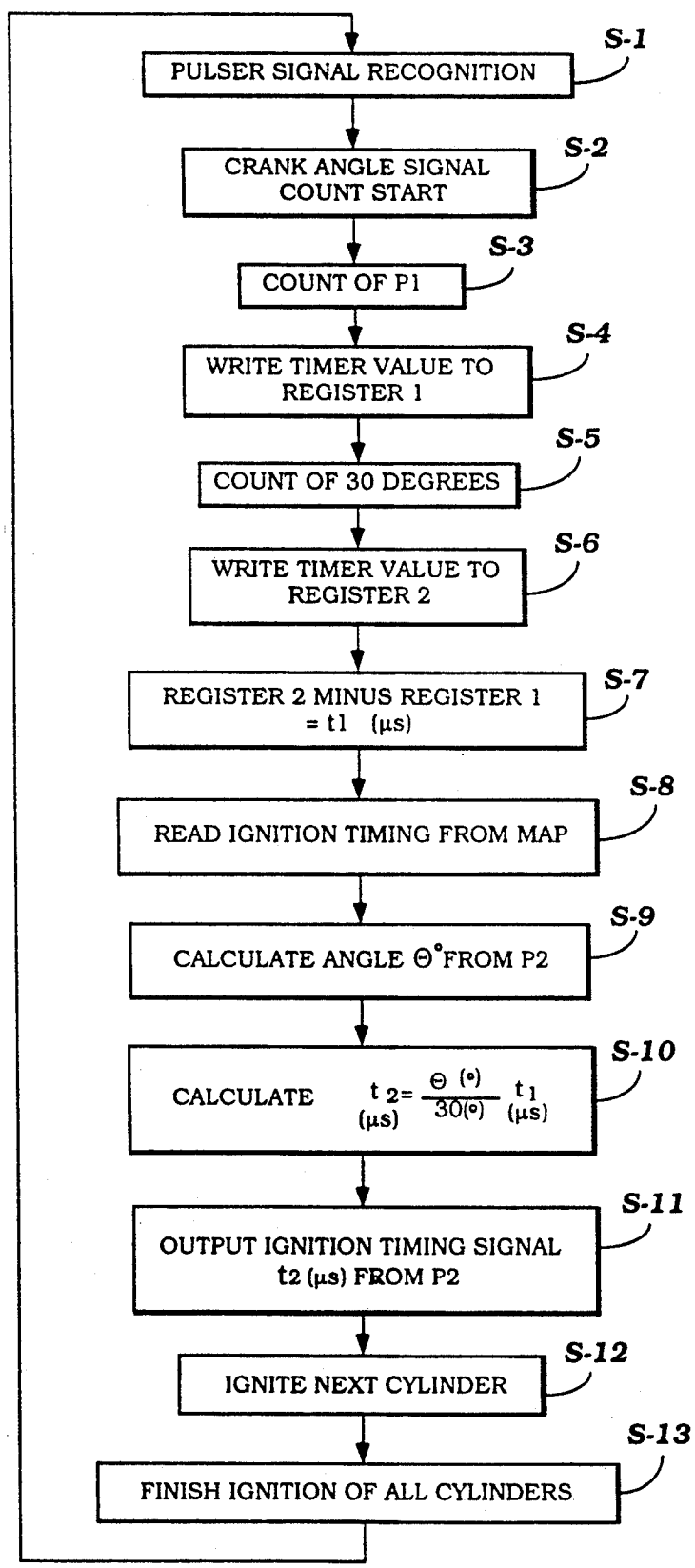
FIG. 3 is a block diagram showing the control routine of the system.

Before proceeding to the detailed computer program employed by the CPU 16 by reference to FIG. 3, a brief description of the method of setting the ignition timing would be helpful. Basically the way the system operates is to select a pre-determined crankshaft angle position P1 in relation to when the crankshaft reference signal from the sensor 12 is outputted. Then a pre-determined degree of crankshaft angle rotation, 30°, in a specific embodiment is selected and the time t1 for the crankshaft to rotate through this 30° angle after the crankshaft position P1 is reached is measured. This is done to determine a crankshaft angular rotational velocity which velocity is measured close to the desired ignition timing.

A second reference crankshaft angle position P2 is set which is after the time P1 but before the time of ignition desired. Preferably the time P2 is set close to the end of the time period t1 after the crankshaft angle position P1 is reached. The position P2 is set at a time when the sensor 13 will output a definite pulse signal and corresponds to one of the teeth on the toothed wheel.

The time t2 for the crankshaft to rotate through the angle $\theta$ when ignition timing is desired is then computed using the angular rotational speed previously computed and the ignition is fired at the time t2 after the point P2 has been reached. By measuring the angular rotational speed of the crankshaft as close as possible to the desired ignition timing, it will be insured that the ignition timing will be extremely accurate. It has been found that with this system, timing accuracies of ±0.5° can be achieved at an idle speed of 600 RPM with a three cylinder, two cycle engine as compared with ±3° with conventional systems.

The method by which the CPU 16 determines the time t2 for firing the spark plugs associated with each cylinder (as noted the system describes a three cylinder, two cycle engine) will now be described by reference to FIG. 3. As has been noted, this is a block diagram showing the control routine of the CPU 16.

After the program starts, it moves to the step S-1 to determine when the reference crank angle position signal is outputted by the pulser 12. The program then moves to the step S-2 to begin counting the passage of individual teeth by the pulser coil 13 until the time P1 is reached. This is then determined at the step S-3 and the CPU 16 then knows that the crankshaft position coincides with the position P1.

The CPU 16 then at the step S-4 enters into a register the time at which the crank angle position P1 was reached and begins counting the number of teeth for the pre-determined crankshaft angle rotation. In this embodiment, as noted, this is three teeth the time for the crankshaft to rotate through 30° and this counting is done at the step S-5.

The program then moves to the step S-6 to enter into a register the time at which the crankshaft reached the second position 30° after the position P1. The program then moves to the step S-7 to compute the time difference and accordingly the time t1 (us) for the crankshaft to rotate through 30° so as to determine the angular rotational speed of the crankshaft.

The CPU 16 then moves to the step S-8 to read the desired ignition timing from the pre programmed maps and responsive to various engine operating conditions, as aforenoted.

Once the desired ignition timing is determined, the CPU 16 moves to the step S-9 so as to calculate the angle from the position P2 necessary to achieve the desired ignition timing. The program then moves to the step S-10 to determine the time t2 that the crankshaft will take to rotate through the angle $\theta$ from the previously measured angular rotation of the crankshaft. This computed in accordance with the following formula:

$$t2_{(us)} = \frac{\theta}{30°} \, t1_{(us)}$$

After the time t2 is computed the CpU 16 moves to the step S-11 to count the time interval t2 and then ignite the spark plug by sending the output signal from the circuit 17 to the ignition circuit 18. The program then moves to the step S-12 to ignite the next cylinder in the same sequence and then to the step S-13 to finish the ignition of all cylinders before the system repeats.

As has been noted, it is desireable to insure that the time P2 is chosen as close as possible to the time when ignition is desired. Therefore, the graphical view of FIG. 2 is exaggerated in that the timing P2 will be much closer to the actual ignition timing then is illustrated and the timing P1 will be quite close to 30° prior to the timing P2 so as to insure optimum accuracy.

It is to be understood that the foregoing description is that of a preferred embodiment of the invention and that various changes and modifications may be made without departing from the spirit and scope of the invention, as defined by the appended claims.

We claim:

1. A method of controlling the spark timing of an internal combustion engine having a shaft rotatably about an axis and means for generating a reference signal indicative of a reference shaft angular position and for generating signals indicative of incremental shaft angular positions, said method comprising the steps of selecting a first angular shaft position in relation to said reference shaft angular position and a later second angular shaft position both before the timing of the firing of the spark plug, selecting a fixed amount of shaft angular rotation, measuring the time said shaft requires to rotate through said selected fixed angular amount after the shaft reaches the first angular shaft position to determine an angular rotational speed for the shaft, computing the time required for the shaft to reach the timing of spark ignition from the second angular shaft position using the computed angular shaft rotational speed, and initiating firing after this time elapses.

2. A method of controlling the spark timing of an internal combustion engine as set forth in claim 1 wherein the means for generating signals indicative of incremental shaft angular positions comprises a toothed wheel and associated sensor that output pulses indicative of individual incremental angular shaft positions.

3. A method of controlling the spark timing of an internal combustion engine as set forth in claim 2 wherein the fixed amount of shaft angular rotation comprises approximately 30°.

4. A method of controlling the spark timing of an internal combustion engine as set forth in claim 1 wherein there are plural spark plug firings per rotation of the shaft.

5. A method of controlling the spark timing of an internal combustion engine as set forth in claim 4 wherein each spark plug firing is done in sequence after the first spark plug is fired in accordance with the method described in claim 1.

6. A method of controlling the spark timing of an internal combustion engine as set forth in claim 5 wherein each spark plug is fired at a timing determined by a method as described in claim 1.

* * * * *